(12) United States Patent
Ould-Ahmed-Vall et al.

(10) Patent No.: US 11,656,870 B2
(45) Date of Patent: **\*May 23, 2023**

(54) SYSTEMS, APPARATUSES, AND METHODS FOR DUAL COMPLEX MULTIPLY ADD OF SIGNED WORDS

(71) Applicant: Intel Corporation, Santa Clara, CA (US)

(72) Inventors: Elmoustapha Ould-Ahmed-Vall, Chandler, AZ (US); Venkateswara R. Madduri, Austin, TX (US); Mark J. Charney, Lexington, MA (US); Robert Valentine, Kiryat Tivon (IL)

(73) Assignee: Intel Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/509,917

(22) Filed: Oct. 25, 2021

(65) Prior Publication Data

US 2022/0107804 A1 Apr. 7, 2022

Related U.S. Application Data

(63) Continuation of application No. 16/614,118, filed as application No. PCT/US2017/040481 on Jun. 30, 2017, now Pat. No. 11,163,563.

(51) Int. Cl.
  *G06F 9/30* (2018.01)
  *G06F 7/544* (2006.01)

(52) U.S. Cl.
  CPC .......... *G06F 9/3001* (2013.01); *G06F 7/5443* (2013.01); *G06F 9/30145* (2013.01)

(58) Field of Classification Search
  CPC ... G06F 9/3001; G06F 9/30145; G06F 7/5443
  See application file for complete search history.

(56) References Cited

U.S. PATENT DOCUMENTS

| | | | |
|---|---|---|---|
| 7,664,930 | B2 | 2/2010 | Khan et al. |
| 7,966,478 | B2 | 6/2011 | Altman et al. |
| 8,984,043 | B2 | 3/2015 | Ginzburg et al. |
| 9,015,354 | B2 | 4/2015 | Pitsianis et al. |
| 9,465,611 | B2 | 10/2016 | Taunton |

(Continued)

OTHER PUBLICATIONS

International Search Report and Written Opinion for International Application No. PCT/US2017/040481, dated Mar. 30, 2018, 11 pages.

*Primary Examiner* — Zachary K Huson
(74) *Attorney, Agent, or Firm* — Trop, Pruner & Hu, P.C.

(57) ABSTRACT

Embodiments of systems, apparatuses, and methods for dual complex number multiplication and addition in a processor are described. For example, execution circuitry executes a decoded instruction to multiplex data values from positions in source operands to a multiplier, the source operands including pairs complex numbers, calculate a real part of a product of each pair of complex numbers, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the results to corresponding positions in the destination operand.

15 Claims, 16 Drawing Sheets

(56) References Cited

U.S. PATENT DOCUMENTS

| | | |
|---|---|---|
| 9,489,197 B2 | 11/2016 | Rahman et al. |
| 9,535,924 B2 | 3/2017 | MacKenzie et al. |
| 10,628,156 B2 | 4/2020 | Anderson et al. |
| 11,163,563 B2 * | 11/2021 | Ould-Ahmed-Vall ........................ G06F 7/5443 |
| 2012/0166511 A1 | 6/2012 | Hiremath et al. |

* cited by examiner

FIG. 8
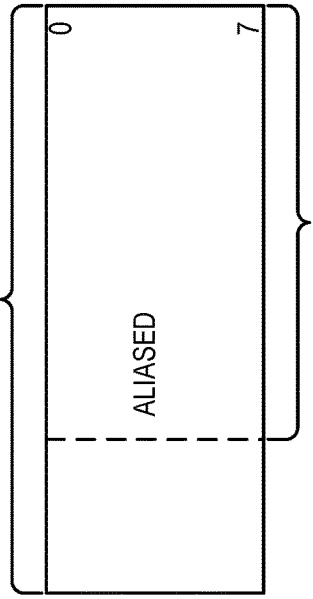
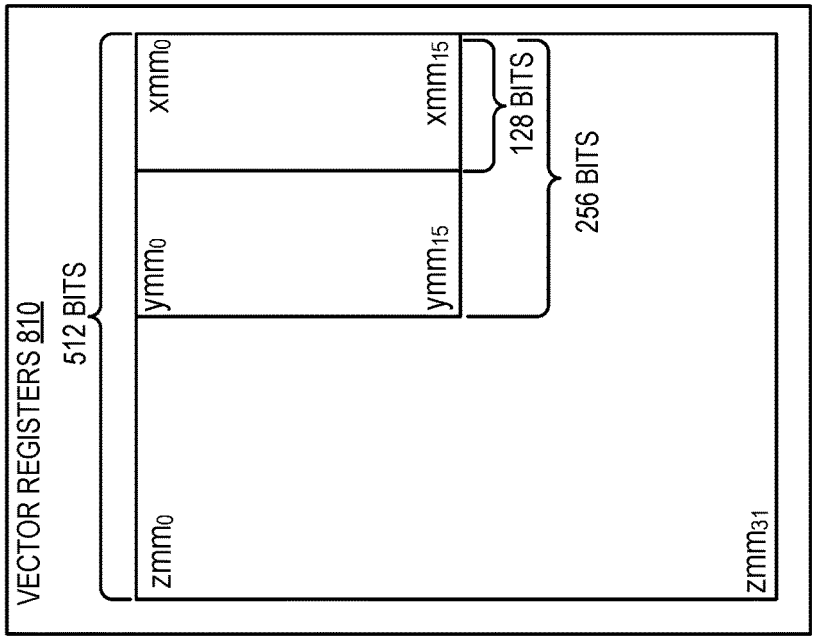

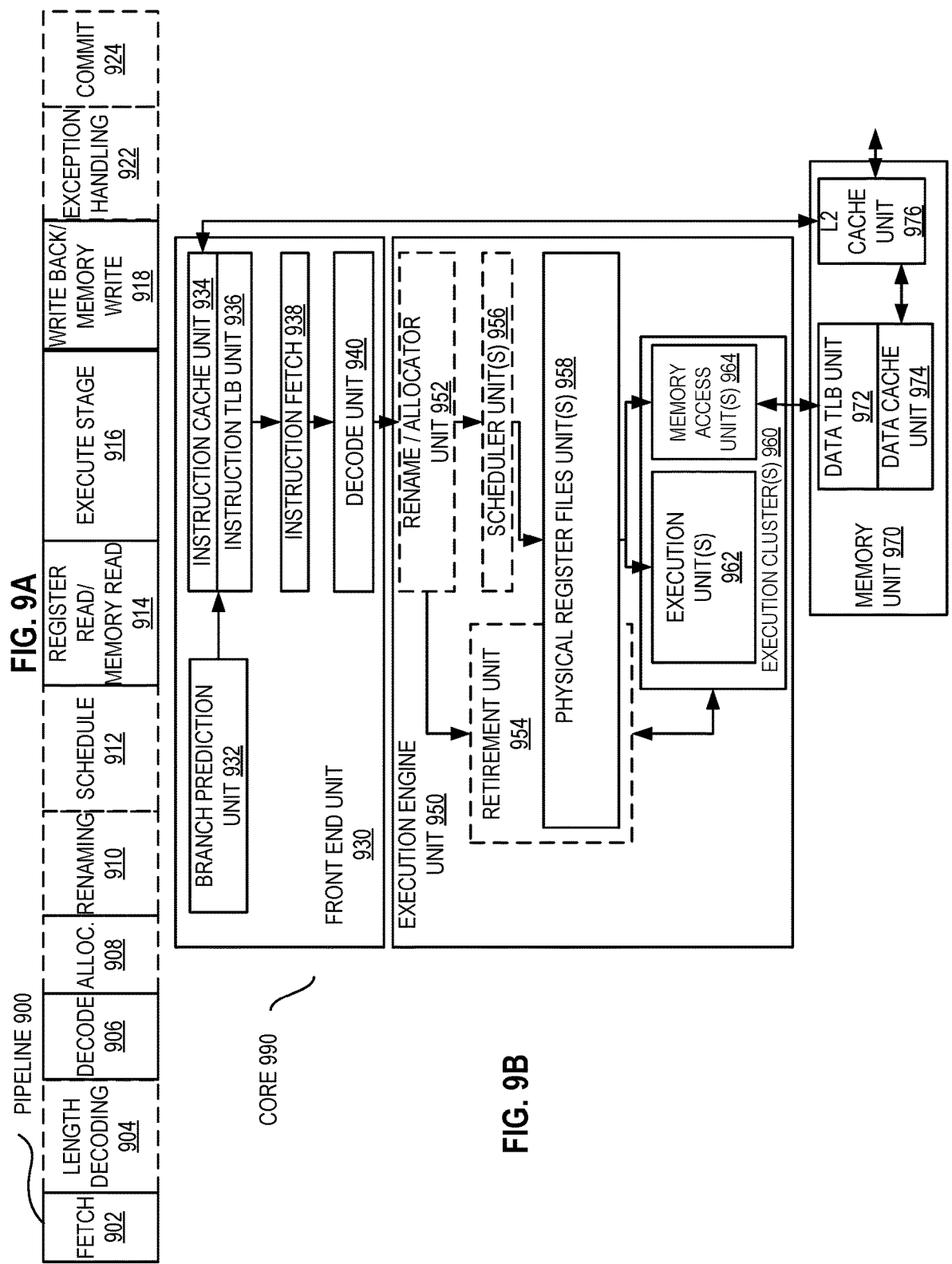

US 11,656,870 B2

SYSTEMS, APPARATUSES, AND METHODS FOR DUAL COMPLEX MULTIPLY ADD OF SIGNED WORDS

FIELD OF INVENTION

The field of invention relates generally to computer processor architecture, and, more specifically, to instructions which when executed cause a particular result.

BACKGROUND

Applications, such as digital signal processing applications, perform various operations on complex vectors that perform filtering, post processing, and other functions. These operations, such as arithmetic calculations, saturation, etc., on both the real and imaginary portions of the complex vectors, typically require sequences of instructions to be performed. This leads to lower performance, as these sequences of instructions are run for each operation.

BRIEF DESCRIPTION OF THE DRAWINGS

The present invention is illustrated by way of example and not limitation in the figures of the accompanying drawings, in which like references indicate similar elements and in which:

FIG. 8 is a block diagram of a register architecture 900 according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
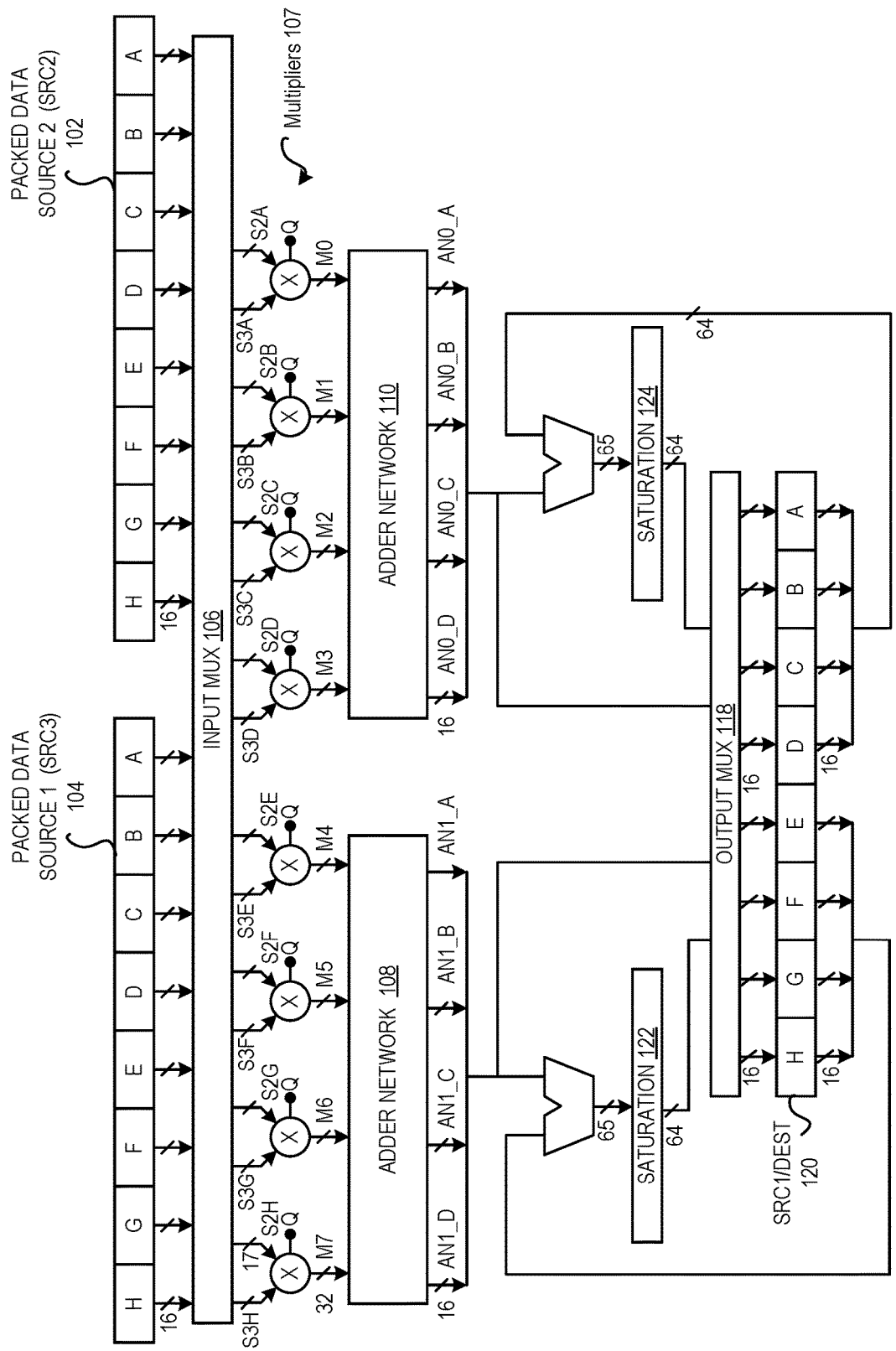
FIG. 1 illustrates an exemplary execution of a dual complex multiply add instruction.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The complex vector operations discussed above previously required sequences of instructions to be executed to generate the desired output. This included, e.g., operations to separately perform complex by complex vector multiplication, addition of corresponding real and imaginary parts, and accumulation of data. Embodiments disclose an instruction pair to perform dual complex multiplication and addition (e.g., including multiply, add, accumulation, and saturation functionality) on complex data in quadwords of vector source registers.

Detailed herein are embodiments of a pair of dual complex multiply add instructions to improve a computer itself by speeding up (and therefore typically using less power) than performing a plurality of operations to perform dual complex multiplication and addition. The execution of these instructions causes an execution circuit (execution unit) to perform complex multiplication on source data. In some embodiments, the execution of a dual complex multiply add instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

FIG. 1 illustrates an exemplary execution of a dual complex multiply add instruction. The dual complex multiply add instruction format includes fields for a destination (packed data destination (SRC1/DST) 120) and two sources (vector packed data source 2 (SRC2) 102 and vector packed data source 3 (SRC3) 104). For example, SRC2 102 and SRC3 104 can each include values for four complex numbers, where each complex number is a double word (e.g., A+Bi, C+Di, etc.). The instruction is for multiplying and adding the real parts of the complex numbers stored in SRC2 102 and SRC3 104. In this example, multiplication is performed first, followed by addition and accumulation of the real parts of the input values.

Packed data source 2 102 includes eight packed data elements (shown at packed data element positions A-H). Depending upon the implementation, vector packed data source 2 102 is a packed data register (e.g., a XMM, YMM, ZMM, vector, SIMD, D, S, etc. register), or a memory location.

Packed data source 3 104 includes eight packed data elements (shown at packed data element positions A-H). Depending upon the implementation, packed data source 3 104 is a packed data register (e.g., a XMM, YMM, ZMM, vector, SIMD, D, S, etc. register), or a memory location.

The two packed data sources 102, 104 are fed into execution circuitry to be operated on. As shown, the execution circuitry can include an input mux 106 which pass the values from the packed data sources 102, 104 to a plurality of multipliers 107. As discussed, the values of corresponding complex numbers (e.g., SRC3(2) and SRC2(2), etc.) are multiplied and the results are then added. The following is an example of complex number multiplication:

$$(x+yi)(u+vi)=(xu-yv)+(xu+yu)i$$

As applied to the complex numbers stored in vector packed data sources SRC2 102 and SRC3 104, such complex multiplication may be represented as:

$$(S2A+S2Bi)(S3A+S3Bi)=(S2A*S3A-S2B*S3B)+(S2A*S3B+S2B*S3A)i$$

The multipliers 107 can perform vector multiplication of the data sources 102, 104. In some embodiments, each input value may be a signed value. As shown in FIG. 1, the multipliers 107 can generate the following values: SRC2(A)*SRC3(A); SRC2(B)*SRC3(B); SRC2(C)*SRC3(C); SRC2(D)*SRC3(D); SRC2(E)*SRC3(E); SRC2(F)*SRC3(F); SRC2(G)*SRC3(G); and SRC2(H)*SRC3(H). Note while a plurality of multipliers is shown, in some embodiments, the same multiplier is reused.

In the embodiment shown in FIG. 1, adder networks 108, 110 can combine the outputs of multipliers 107 to calculate the real part of dual complex number multiplication. As such, the dual complex multiply add instruction calculates a first product of a first pair of complex numbers and adds the first product to a second product of a second pair of complex numbers. Each complex number includes a real part and an imaginary part. In some embodiments, each real part and imaginary part may be a 16 bit word stored in consecutive data element positions in the source operands. Each pair of complex numbers may include a complex number from the same data element positions in each source operand. For example, in the embodiment of FIG. 1, a first pair of complex numbers may include a first complex number stored at SC2A (real part) and SC2B (imaginary part) and a second complex number stored at SC3A (real part) and SC3B (imaginary part). Similarly, a second pair of complex numbers may be at SC2C/SC2D and SC3C/SC3D, a third pair of complex numbers at SC2F/SC2F and SC3E/SC3F, and a fourth pair of complex numbers at SC2G/SC2H and SC3G/SC3H. When the dual complex multiply add instruction is executed, the sum of the products of the first and second pairs of complex numbers can be calculated, for example:

$$SRC3(2) \times SRC2(2)+SRC3(1) \times SRC2(1)$$

$$SRC3(4) \times SRC2(4)+SRC3(3) \times SRC2(3)$$

where:
SRC2(1) and SRC2(2) are the $1^{st}$ and $2^{nd}$ complex numbers of SRC2 102
SRC3(1) and SRC3(2) are the $1^{st}$ and $2^{nd}$ complex numbers of SRC3 104
SRC2(3) and SRC2(4) are the $3^{rd}$ and $4^{th}$ complex numbers of SRC2 102
SRC3(3) and SRC3(4) are the $3^{rd}$ and $4^{th}$ complex numbers of SRC3 104

A pseudocode representation of this is shown below:

```
TEMP0[33:0] ← (((SRC2[47:32] * SRC3[47:32]) - (SRC2[63:48] * SRC3[63:48])) +
    ((SRC2[15:0] * SRC3[15:0]) - (SRC2[31:16] * SRC3[31:16]))); (* Real
    Number *)
TEMP1[33:0] ← (((SRC2[111:96] * SRC3[111:96]) - (SRC2[127:112] * SRC3[127:112])) +
    ((SRC2[79:64] * SRC3[79:64]) - (SRC2[95:80] * SRC3[95:80]))); (* Real
    Number *)
```

As shown, the real part of the results of multiplying and summing the first and second complex numbers of SRC2 102 and SRC3 104 can be stored to a first temporary register and the real part of the results of multiplying and summing the third and fourth complex numbers of SRC2 102 and SRC3 104 can be stored to a second temporary register.

Vector packed data destination 120 stores the results from the adder networks 108 and 110 via output mux 118. Depending upon the implementation, packed data source 1/destination 120 is a packed data register (e.g., a XMM, YMM, ZMM, vector, SIMD, D, S, etc. register), or a memory location. In this illustration, packed data destination 120 is the same as packed data source 1, however, that does not need to be the case. In some embodiments, before adding to the appropriate accumulator each of the real signed results can be sign extended and accumulated to the corresponding 64-bits of real values in the destination registers. For example, as shown in the following pseudocode representation, the results stored to the first temporary register can be sign extended and then stored to the lower 64 bits of the destination 120, and the results stored to the second temporary register can be sign extended and then stored to the upper 64 bits of the destination 120.

```
DEST[63:0] ← AddToQuadword({{30{TEMP0[33]}}, TEMP0[33:0]}, DEST[63:0]);
(* Real Number *)
DEST[127:64] ← AddToQuadword({{30{TEMP1[33|}}, TEMP1[33:0]}, DEST[127:64]);
(* Real Number *)
```

In some embodiments, the sign extended results may be saturated using saturation circuits 122, 124 before they are stored to the vector packed data destination, for example, as shown in the following pseudocode representation:

```
TEMP[63:0] ← (SRC[63:0] + DEST[63:0]);
IF (SRC[63] == 1'b0) AND (DEST[63] == 1'b0) AND (TEMP[63] == 1'b1)
    DEST[63:0] ← 0x7FFF_FFFF_FFFF_FFFF; (* Most Positive Number *)
    MXCSR.Sat_Acc ← 1;
    MXCSR.Sat ← 1;
ELSE IF SRC[63] == 1'b1) AND (DEST[63] == 1'b1) AND (TEMP[63] == 1'b0)
    DEST[63:0] ← 0x8000_0000_0000_0000; (* Most Negative Number *)
    MXCSR.Sat_Acc ← 1;
    MXCSR.Sat ← 1;
ELSE
    DEST[63:0] ← TEMP[63:0];
```

Figure 2:
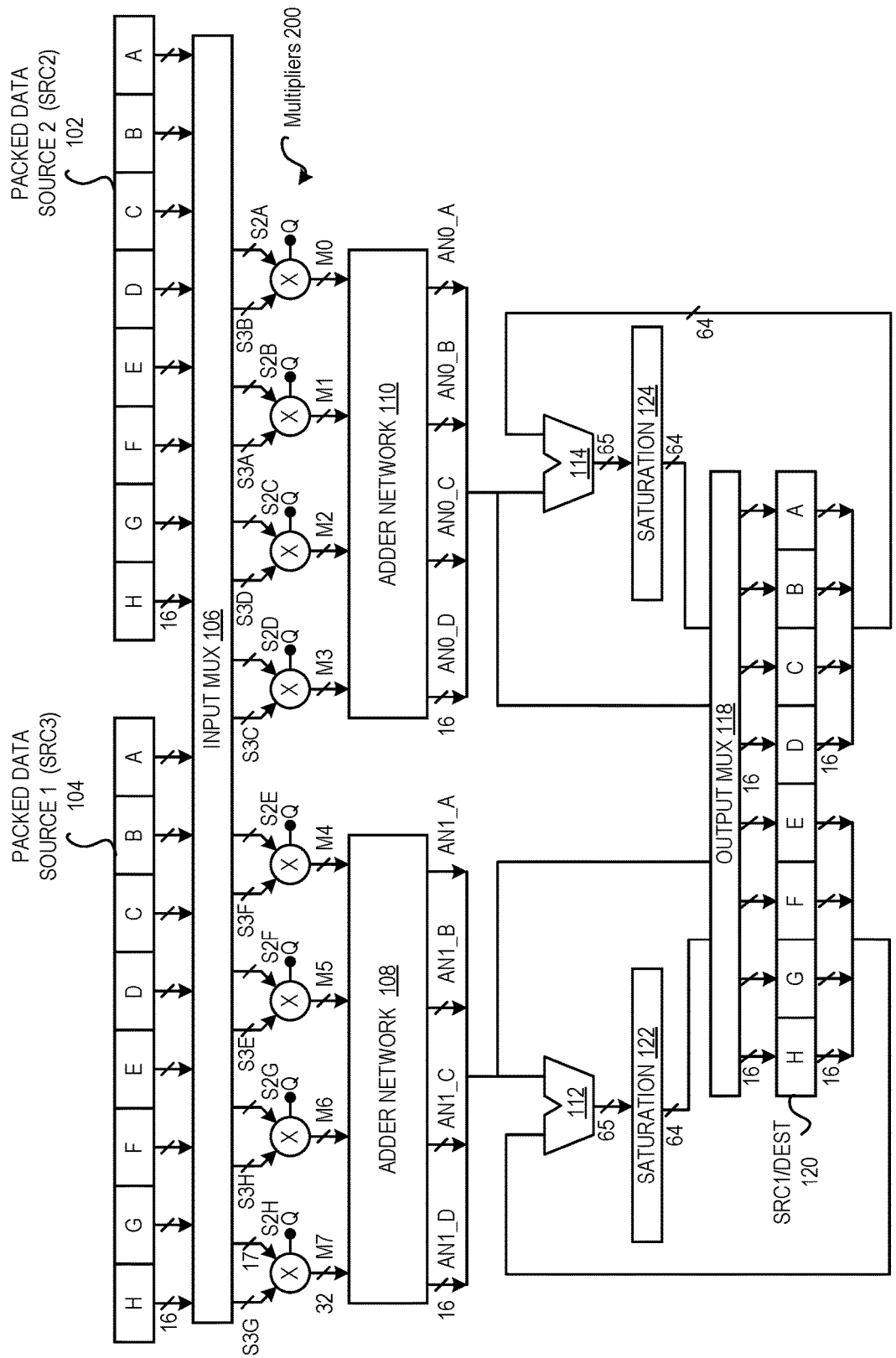
FIG. 2 illustrates an exemplary execution of a dual complex multiply add instruction.

FIG. 2 illustrates an exemplary execution of a dual complex multiply add instruction. The dual complex multiply add instruction format includes fields for a destination (packed data destination (SRC1/DST) 120) and two sources (vector packed data source 2 (SRC2) 102 and vector packed data source 3 (SRC3) 104). In this example, the instruction can multiply and add the imaginary parts of the complex numbers from the data sources 102, 104. For example, SRC2 102 and SRC3 104 can each include values for four complex numbers, where each complex number is a double word (e.g., A+Bi, C+Di, etc.).

The two packed data sources 102, 104 are fed into execution circuitry to be operated on. As shown, the execution circuitry can include an input mux 106 which pass the values from the packed data sources 102, 104 to a plurality of multipliers 107. As discussed, the values of corresponding complex numbers (e.g., SRC3(2) and SRC2(2), etc.) are multiplied and the results are then added.

The multipliers 200 can perform vector multiplication of the data sources 102, 104. In some embodiments, each input value may be a signed value. As shown in FIG. 2, the multipliers 200 can generate the following values: SRC2(A)*SRC3(B); SRC2(B)*SRC3(A); SRC2(C)*SRC3(D); SRC2(D)*SRC3(C); SRC2(E)*SRC3(F); SRC2(F)*SRC3(E); SRC2(G)*SRC3(H); and SRC2(H)*SRC3(G). Note while a plurality of multipliers is shown, in some embodiments, the same multiplier is reused.

In the embodiment shown in FIG. 2, adder networks 108, 110 can combine the outputs of multipliers 200 to calculate the imaginary part of dual complex number multiplication. As in the example above, the order of the operands are:

SRC3(2)×SRC2(2)+SRC3(1)×SRC2(1)

SRC3(4)×SRC2(4)+SRC3(3)×SRC2(3)

where:

SRC2(1) and SRC2(2) are the $1^{st}$ and $2^{nd}$ complex numbers of SRC2 102

SRC3(1) and SRC3(2) are the $1^{st}$ and $2^{nd}$ complex numbers of SRC3 104

SRC2(3) and SRC2(4) are the $3^{rd}$ and $4^{th}$ complex numbers of SRC2 102

SRC3(3) and SRC3(4) are the $3^{rd}$ and $4^{th}$ complex numbers of SRC3 104

A pseudocode representation of this is shown below:

```
TEMP0[33:0] ← (((SRC2[47:32] * SRC3[63:48]) + (SRC2[63:48] * SRC3[47:32])) +
    ((SRC2[15:0] * SRC3[31:16]) + (SRC2[31:16] * SRC3[15:0]))); (* Imaginary
    Number *)
TEMP1[33:0] ← (((SRC2[111:96] * SRC3[127:112]) + (SRC2[127:112] * SRC3[111:96])) +
    ((SRC2[79:64] * SRC3[95:80]) + (SRC2[95:80] * SRC3[79:64]))); (*
    Imaginary Number *)
```

As shown, the imaginary part of the results of multiplying and summing the first and second complex numbers of SRC2 102 and SRC3 104 can be stored to a first temporary register and the imaginary part of the results of multiplying and summing the third and fourth complex numbers of SRC2 102 and SRC3 104 can be stored to a second temporary register.

Vector packed data destination 120 stores the results from the adder networks 108 and 110. Depending upon the implementation, packed data source 1/destination 120 is a packed data register (e.g., a XMM, YMM, ZMM, vector, SIMD, D, S, etc. register), or a memory location. In this illustration, packed data destination 120 is the same as packed data source 1, however, that does not need to be the case. In some embodiments, before adding to the appropriate accumulator each of the imaginary signed results can be sign extended and accumulated to the corresponding 64-bits of imaginary values in the destination registers. For example, as shown in the following pseudocode representation, the results stored to the first temporary register can be sign extended and then stored to the lower 64 bits of the destination 120, and the results stored to the second temporary register can be sign extended and then stored to the upper 64 bits of the destination 120.

---

DEST[63:0] ← AddToQuadword({{30{TEMP0[33]}}, TEMP0[33:0]}, DEST[63:0]);
(*Imaginary Number *)
DEST[127:64] ← AddToQuadword(({30{TEMP1[33]}}, TEMP1[33:0]}, DEST[127:64]):
(* Imaginary Number *)

---

In some embodiments, as discussed above, the sign extended results may be saturated before they are stored to the vector packed data destination.

Figure 3:
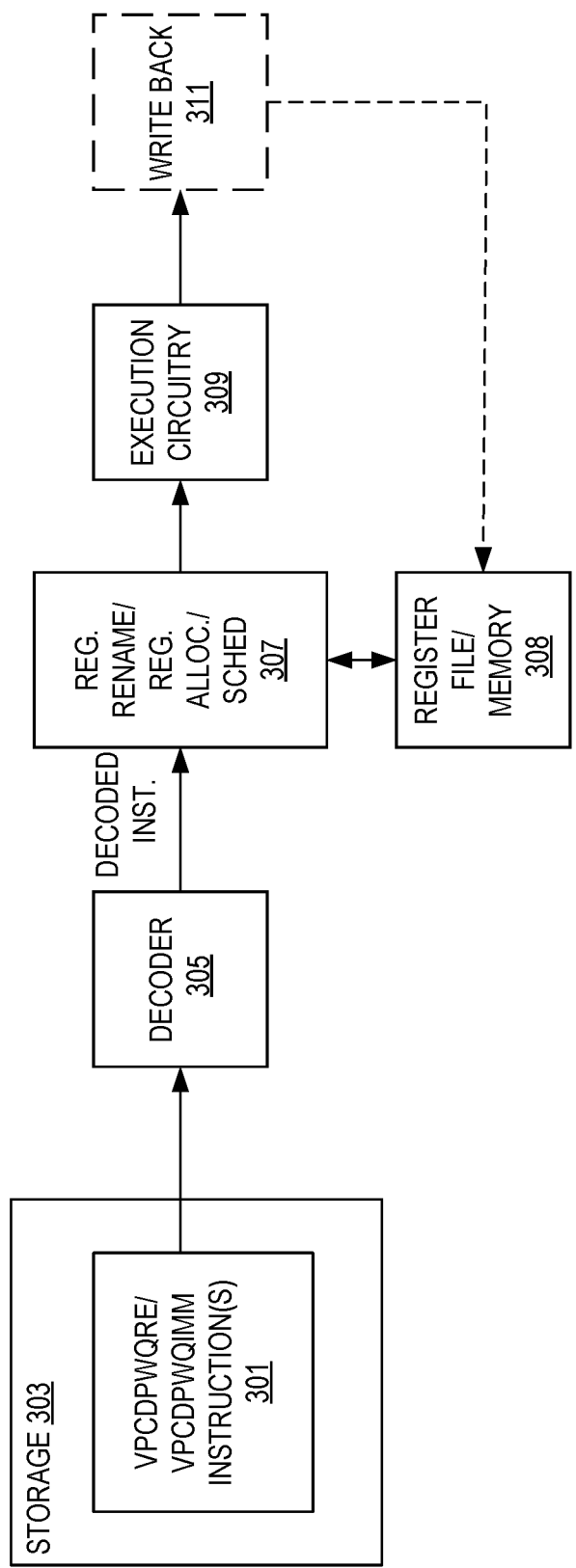
FIG. 3 illustrates an embodiment of hardware to process an instruction such as a dual complex multiply add instruction.

FIG. 3 illustrates an embodiment of hardware to process instructions such as a dual complex multiply add instructions. As illustrated, storage 301 stores dual complex multiply add instructions 301 to be executed.

Each instruction is received by decode circuitry 305. For example, the decode circuitry 305 receives this instruction from fetch logic/circuitry. The instruction 301 includes fields for an opcode, first and second sources, and a destination. In some embodiments, the sources and destination are registers, and in other embodiments one or more are memory locations. More detailed embodiments of at least one instruction format will be detailed later. The decode circuitry 305 decodes the instruction into one or more operations. In some embodiments, this decoding includes generating a plurality of micro-operations to be performed by execution circuitry (such as execution circuitry 309). The decode circuitry 305 also decodes instruction prefixes.

In some embodiments, register renaming, register allocation, and/or scheduling circuitry 307 provides functionality for one or more of: 1) renaming logical operand values to physical operand values (e.g., a register alias table in some embodiments), 3) allocating status bits and flags to the decoded instruction, and 3) scheduling the decoded instruction for execution on execution circuitry out of an instruction pool (e.g., using a reservation station in some embodiments).

Registers (register file) and/or memory 308 store data as operands of the instruction to be operated on by execution circuitry. Exemplary register types include packed data registers, general purpose registers, and floating point registers.

Execution circuitry executes 309 the decoded instruction. Exemplary detailed execution circuitry was shown in FIGS. 1 and 2. The execution of the decoded instruction causes the execution circuitry to perform dual complex multiplication and addition of the real or imaginary parts of source complex numbers. In some embodiments, the execution of a decoded dual complex multiply add instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

Write back (retirement) circuitry 311 commits the result of the execution of the decoded instruction.

In some embodiments, retirement/write back circuitry architecturally commits the destination register into the registers or memory and retires the instruction.

Figure 7A:
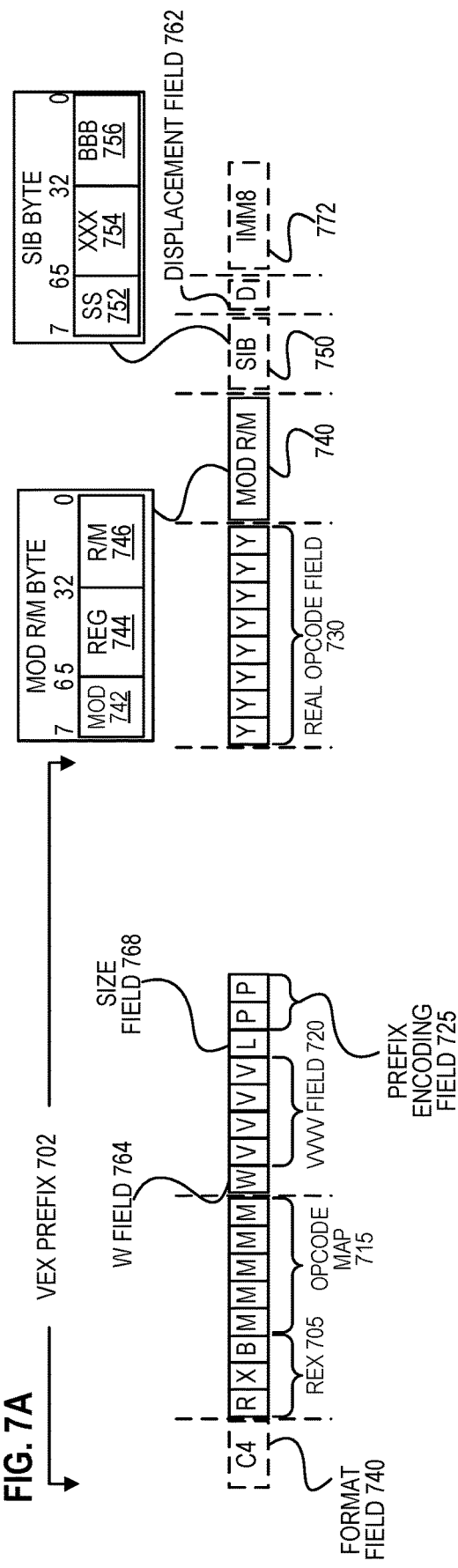
FIG. 7A is a block diagram illustrating an exemplary specific vector friendly instruction format according to embodiments of the invention.

An embodiment of a format for a dual complex multiply add of real parts instruction is VPCDPWQRE DSTREG, SRC1, SRC2, and a format for a dual complex multiply add of imaginary parts instruction is VPCDPWQIMM DSTREG, SRC1, SRC2. In some embodiments, VPCDPWQRE{B/W/D/Q} is the opcode mnemonic of the instruction for the real operations and VPCDPWQIMM{B/W/D/Q} is the opcode mnemonic of the instruction for the imaginary operations. DSTREG is a field for the packed data destination register operand. SRC1 and SRC2 are fields for the sources such as packed data registers and/or memory. In some embodiments, the instructions can be VEX encoded. In some embodiments, SRC1 may be a "vvvv" value (such as 720), and in some embodiments, SRC2 may be a R/M value (such as 746), as discussed further with respect to FIG. 7.

In some embodiments, the dual complex multiply add instructions include VPCDPWQRE DESTR, SRC2, SRC3 (which performs dual complex multiply add on the real parts of the input complex numbers) and VPCDPWQIMM DESTR, SRC2, SRC3 (which performs dual complex multiply add on the imaginary parts of the input complex numbers). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Figure 4:
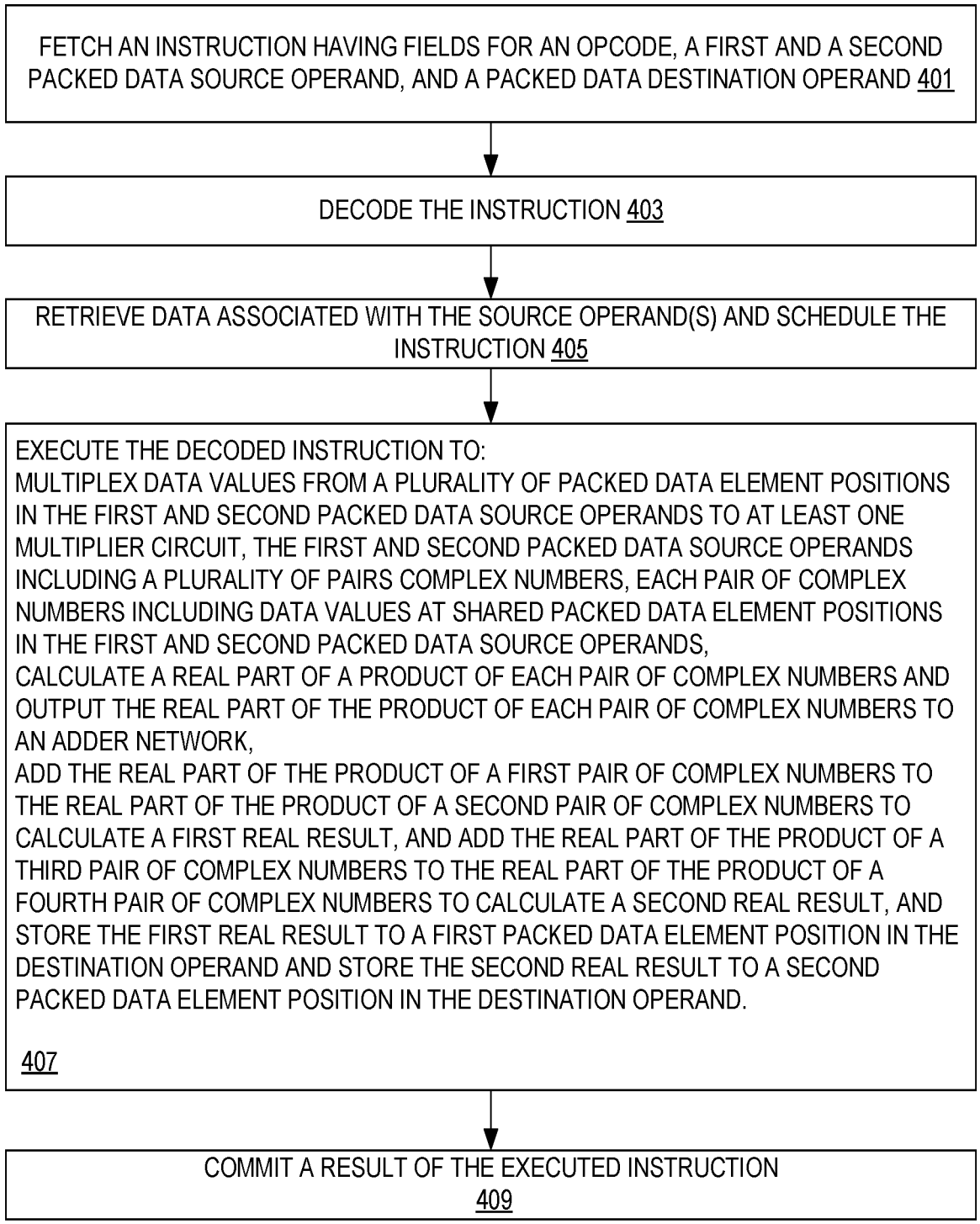
FIG. 4 illustrates an embodiment of a method performed by a processor to process a real part dual complex multiply add instruction.

FIG. 4 illustrates an embodiment of method performed by a processor to process a dual complex multiply add instruction. For example, the processor components of FIG. 3, a pipeline as detailed below, etc. performs this method.

At 401, an instruction is fetched. For example, dual complex multiply add of real parts instruction is fetched. The dual complex multiply add of real parts instruction includes fields for an opcode, a first and a second source operand, and a destination operand. In some embodiments, the instruction further includes a field for a writemask. In some embodiments, the instruction is fetched from an instruction cache. The source operands and destination operand can be vector packed data.

The fetched instruction is decoded at 403. For example, the fetched dual complex multiply add of real parts instruction is decoded by decode circuitry such as that detailed herein.

Data values associated with the source operands of the decoded instruction are retrieved at 405 and the decoded instruction is scheduled (as needed). For example, when one or more of the source operands are memory operands, the data from the indicated memory location is retrieved.

At 407, the decoded instruction is executed by execution circuitry (hardware) such as that detailed herein. For the dual complex multiply add instruction, the execution will cause execution circuitry to sum the products of pairs of complex numbers in source data. In some embodiments, the execution of a decoded dual complex multiply add instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

In some embodiments, the instruction is committed or retired at 409.

Figure 5:
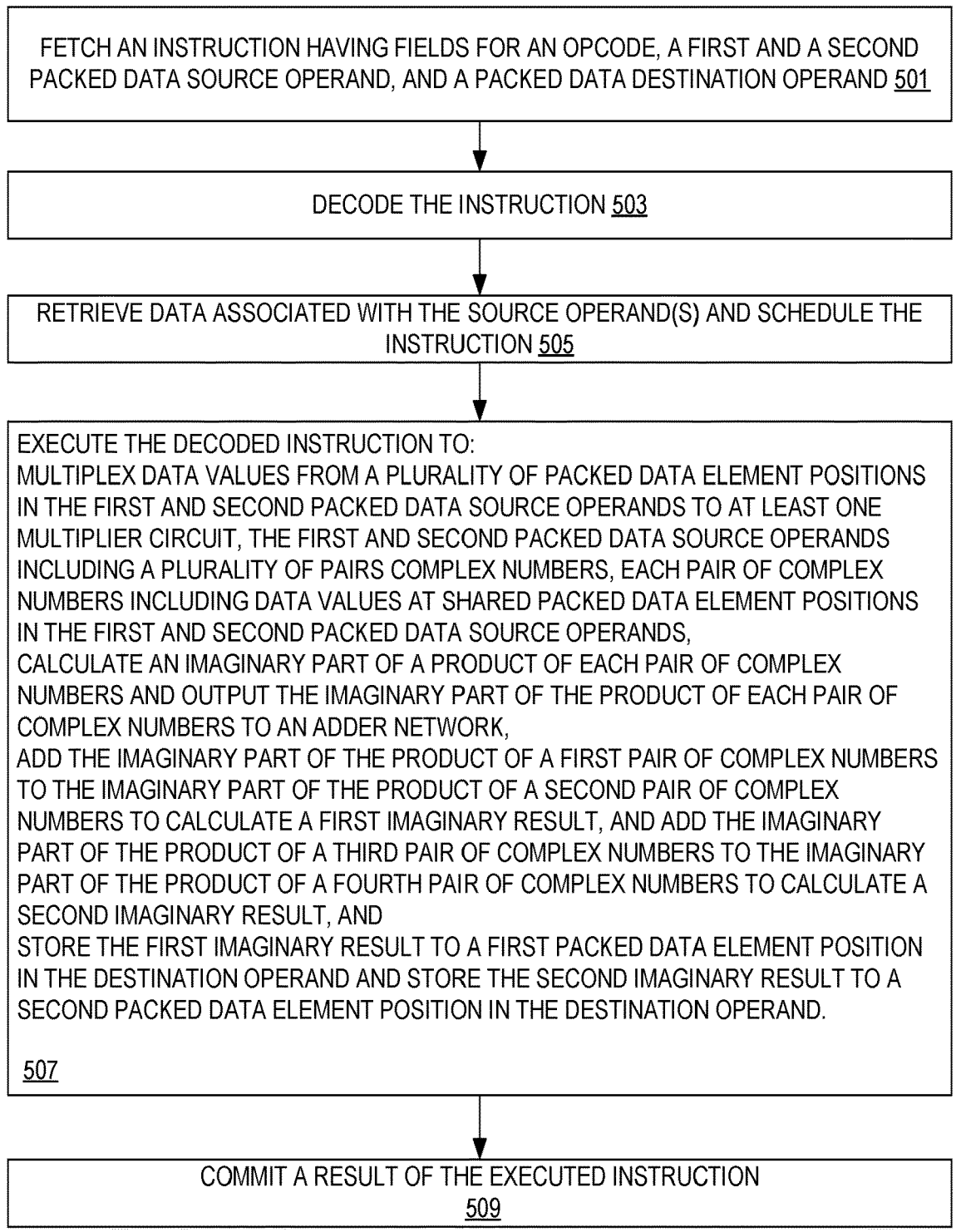
FIG. 5 illustrates an embodiment of a method performed by a processor to process an imaginary part dual complex multiply add instruction.

FIG. 5 illustrates an embodiment of method performed by a processor to process a dual complex multiply add of imaginary parts instruction. For example, the processor components of FIG. 2, a pipeline as detailed below, etc. performs this method.

At 501, an instruction is fetched. For example, a dual complex multiply add of imaginary parts instruction is fetched. The imaginary part dual complex multiply add instruction includes fields for an opcode, a first and a second source operand, and a destination operand. In some embodiments, the instruction further includes a field for a writemask. In some embodiments, the instruction is fetched from an instruction cache. The source operands and destination operand can be vector packed data.

The fetched instruction is decoded at 503. For example, the fetched dual complex multiply add instruction is decoded by decode circuitry such as that detailed herein.

Data values associated with the source operands of the decoded instruction are retrieved at 505 and the decoded instruction is scheduled (as needed). For example, when one or more of the source operands are memory operands, the data from the indicated memory location is retrieved.

At 507, the decoded instruction is executed by execution circuitry (hardware) such as that detailed herein. For the dual complex multiply add instruction, the execution will cause execution circuitry to sum the products of pairs of complex numbers in source data. In some embodiments, the execution of a decoded dual complex multiply add instruction causes an execution circuit to multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an imaginary part of a product of each pair of complex numbers and output the imaginary part of the product of each pair of complex numbers to an adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to a first packed data element position in the destination operand and store the second imaginary result to a second packed data element position in the destination operand.

In some embodiments, the instruction is committed or retired at 509.

Figure 6:
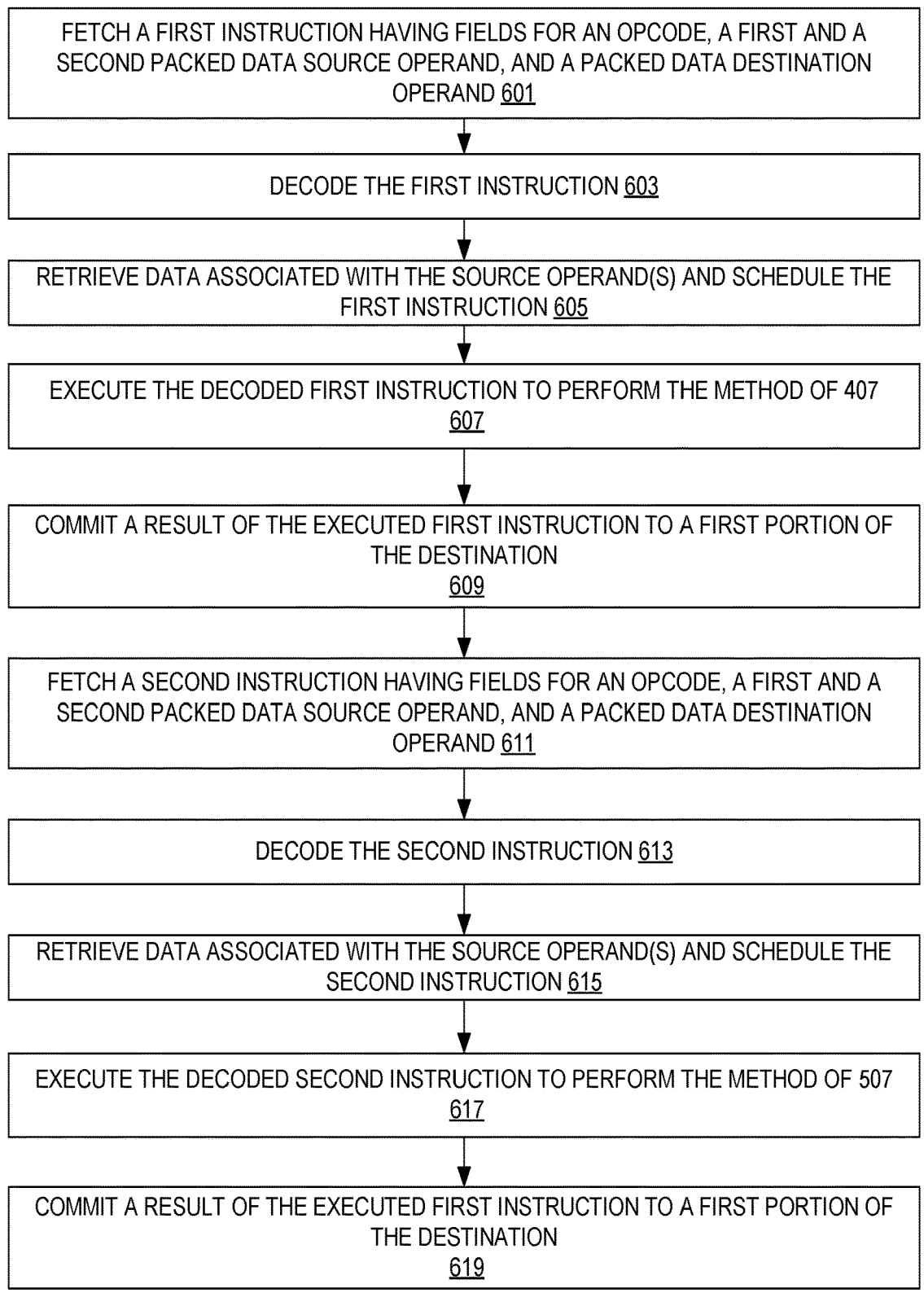
FIG. 6 illustrates an embodiment of a method performed by a processor to process dual complex multiply add instructions.

FIG. 6 illustrates an embodiment of a method performed by a processor to process dual complex multiply add instructions. As discussed above, dual complex multiply add instructions can be executed in turn as a pair to calculate both the real and the imaginary parts of the result. For example, the processor components of FIG. 3, a pipeline as detailed below, etc. performs this method.

At 601, a first instruction is fetched. For example, dual complex multiply add of real parts instruction is fetched. The dual complex multiply add of real parts instruction includes fields for an opcode, a first and a second source operand, and a destination operand. In some embodiments, the instruction further includes a field for a writemask. In some embodiments, the instruction is fetched from an instruction cache. The source operands and destination operand can be vector packed data.

The fetched first instruction is decoded at 603. For example, the fetched dual complex multiply add of real parts instruction is decoded by decode circuitry such as that detailed herein.

Data values associated with the source operands of the decoded instruction are retrieved at 605 and the decoded instruction is scheduled (as needed). For example, when one or more of the source operands are memory operands, the data from the indicated memory location is retrieved.

At 607, the decoded first instruction is executed by execution circuitry (hardware) such as that detailed herein. When the decoded first instruction executed, the execution will cause execution circuitry to sum the products of pairs of complex numbers in source data, as described above with respect to 407.

In some embodiments, the instruction is committed or retired at 609.

At 611, a second instruction is fetched. For example, a dual complex multiply add of imaginary parts instruction is fetched. The imaginary part dual complex multiply add instruction includes fields for an opcode, a first and a second source operand, and a destination operand. In some embodiments, the instruction further includes a field for a writemask. In some embodiments, the instruction is fetched from an instruction cache. The source operands and destination operand can be vector packed data.

The fetched second instruction is decoded at 613. For example, the fetched dual complex multiply add instruction is decoded by decode circuitry such as that detailed herein.

Data values associated with the source operands of the decoded instruction are retrieved at 615 and the decoded instruction is scheduled (as needed). For example, when one or more of the source operands are memory operands, the data from the indicated memory location is retrieved.

At 615, the decoded second instruction is executed by execution circuitry (hardware) such as that detailed herein. When the decoded second instruction executed, the execution will cause execution circuitry to sum the products of pairs of complex numbers in source data, as described above with respect to 507.

In some embodiments, the instruction is committed or retired at 619.

Although the embodiment described with respect to FIG. 6 includes executing the dual complex multiply add of the real parts instruction before the dual complex multiply add of the imaginary parts instruction, in some embodiments the instruction pair may be executed in the reverse order. As discussed, the first instruction of the pair calculates and accumulates the real parts of the dual complex number multiplication and addition. For example, both qwords of a 128-bit accumulator will include real numbers. The second instruction of the pair calculates and accumulates the imaginary parts of the dual complex number multiplication and addition. For example, both qwords of a 128-bit accumulator will include the imaginary numbers. By using the two instructions in a loop, both the real and imaginary parts can be accumulated. In some embodiments, after the accumulation of real (or imaginary) numbers, the qwords of the accumulator can optionally be shifted, saturated and rounded to 16 or 32-bits using SSR instructions. In some embodiments, after the optional SSR operations, each of the qwords of the accumulator with real or imaginary numbers can be horizontally added and written into a register or memory location.

Exemplary embodiments are detailed below.

1. An apparatus comprising: a decoder to decode an instruction having fields for a first and a second packed data source operand, and a packed data destination operand, and execution circuitry to execute the decoded instruction to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

2. The apparatus of example 1, wherein the first packed data source operand is a packed data register and the second packed data source operand is a memory location.

3. The apparatus of example 1, wherein the first packed data source operand is a packed data register and the second packed data source operand is a packed data register.

4. The apparatus of example 1, wherein to calculate a real part of a product of each pair of complex numbers the execution circuitry is further to: multiply a real part of each complex number of the first packed data source operand by a real part of each corresponding complex number of the second packed data source operand to generate a first plurality of products; multiply an imaginary part of each complex number of the first packed data source operand by an imaginary part of each complex number of the second packed data source operand to generate a second plurality of products; and subtract each of the second plurality of products from a corresponding product of the first plurality of products to generate the real part of the product of each pair of complex numbers.

5. The apparatus of example 1, wherein the packed data destination operand is a packed data register and the first packed data element position is a lower 64 bits of the packed data register and the second packed data element position is an upper 64 bits of the packed data register.

6. The apparatus of example 1, wherein the decoder is further to decode a second instruction having fields for the first and the second packed data source operand, and a second packed data destination operand, and wherein the execution circuitry is further to execute the decoded second instruction to: multiplex the data values from the plurality of packed data element positions in the first and second packed data source operands to the at least one multiplier circuit, the first and second packed data source operands including the plurality of pairs complex numbers, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

7. A method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

8. The method of example 7, wherein the first packed data source operand is a packed data register and the second packed data source operand is a memory location.

9. The method of example 7, wherein the first packed data source operand is a packed data register and the second packed data source operand is a packed data register.

10. The method of example 7, wherein to calculate a real part of a product of each pair of complex numbers the execution circuitry is further to: multiply a real part of each complex number of the first packed data source operand by a real part of each corresponding complex number of the second packed data source operand to generate a first plurality of products; multiply an imaginary part of each complex number of the first packed data source operand by an imaginary part of each complex number of the second packed data source operand to generate a second plurality of products; and subtract each of the second plurality of products from a corresponding product of the first plurality of products to generate the real part of the product of each pair of complex numbers.

11. The method of example 7, wherein the packed data destination operand is a packed data register and the first packed data element position is a lower 64 bits of the packed data register and the second packed data element position is an upper 64 bits of the packed data register.

12. The method of example 7, further comprising: decoding a second instruction having fields for the first and the second packed data source operand, and a second packed data destination operand; and executing the decoded second instruction to: multiplex the data values from the plurality of packed data element positions in the first and second packed data source operands to the at least one multiplier circuit, the first and second packed data source operands including the plurality of pairs complex numbers, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

13. The method of example 7, wherein the decoded instruction and the decoded second instruction are executed in a loop and the packed data destination operand and second packed data destination operand are different packed data registers.

14. A non-transitory machine-readable medium storing an instruction which when executed by a processor causes the processor to perform a method, the method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

15. The non-transitory machine-readable medium of example 14, wherein the first source packed data operand is a packed data register and the second source packed data operand is a memory location.

16. The non-transitory machine-readable medium of example 14, wherein the first source packed data operand is a packed data register and the second source packed data operand is a packed data register.

17. The non-transitory machine-readable medium of example 14, wherein to calculate a real part of a product of each pair of complex numbers the execution circuitry is further to: multiply a real part of each complex number of the first packed data source operand by a real part of each corresponding complex number of the second packed data source operand to generate a first plurality of products; multiply an imaginary part of each complex number of the first packed data source operand by an imaginary part of each complex number of the second packed data source operand to generate a second plurality of products; and subtract each of the second plurality of products from a corresponding product of the first plurality of products to generate the real part of the product of each pair of complex numbers.

18. The non-transitory machine-readable medium of example 14, wherein the packed data destination operand is a packed data register and the first packed data element position is a lower 64 bits of the packed data register and the second packed data element position is an upper 64 bits of the packed data register.

19. The non-transitory machine-readable medium of example 14, wherein the method further comprises: decoding a second instruction having fields for the first and the second packed data source operand, and a second packed data destination operand; and executing the decoded second instruction to: multiplex the data values from the plurality of packed data element positions in the first and second packed data source operands to the at least one multiplier circuit, the first and second packed data source operands including the plurality of pairs complex numbers, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

20. The non-transitory machine-readable medium of example 14, wherein the decoded instruction and the decoded second instruction are executed in a loop and the packed data destination operand and second packed data destination operand are different packed data registers.

21. An apparatus comprising: a decoder to decode an instruction having fields for a first and a second packed data source operand, and a packed data destination operand, and execution circuitry to execute the decoded instruction to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

22. The apparatus of example 21, wherein the first packed data source operand is a packed data register and the second packed data source operand is a memory location.

23. The apparatus of example 21, wherein the first packed data source operand is a packed data register and the second packed data source operand is a packed data register.

24. The apparatus of example 21, wherein to calculate an imaginary part of a product of each pair of complex numbers the execution circuitry is further to: multiply a real part of each complex number of the first packed data source operand by an imaginary part of each corresponding complex number of the second packed data source operand to generate a first plurality of products; multiply an imaginary part of each complex number of the first packed data source operand by a real part of each complex number of the second packed data source operand to generate a second plurality of products; and add each of the second plurality of products to a corresponding product of the first plurality of products to generate the imaginary part of the product of each pair of complex numbers.

25. The apparatus of example 21, wherein the packed data destination operand is a packed data register and the first packed data element position is a lower 64 bits of the packed data register and the second packed data element position is an upper 64 bits of the packed data register.

26. The apparatus of example 21, wherein the decoder is further to decode a second instruction having fields for the first and the second packed data source operand, and a second packed data destination operand, and wherein the execution circuitry is further to execute the decoded second instruction to: multiplex the data values from the plurality of packed data element positions in the first and second packed data source operands to the at least one multiplier circuit, the first and second packed data source operands including the plurality of pairs complex numbers, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

27. A method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

28. The method of example 27, wherein the first packed data source operand is a packed data register and the second packed data source operand is a memory location.

29. The method of example 27, wherein the first packed data source operand is a packed data register and the second packed data source operand is a packed data register.

30. The method of example 27, wherein to calculate an imaginary part of a product of each pair of complex numbers the execution circuitry is further to: multiply a real part of each complex number of the first packed data source operand by an imaginary part of each corresponding complex number of the second packed data source operand to generate a first plurality of products; multiply an imaginary part of each complex number of the first packed data source operand by a real part of each complex number of the second packed data source operand to generate a second plurality of products; and add each of the second plurality of products to a corresponding product of the first plurality of products to generate the imaginary part of the product of each pair of complex numbers.

31. The method of example 27, wherein the packed data destination operand is a packed data register and the first packed data element position is a lower 64 bits of the packed data register and the second packed data element position is an upper 64 bits of the packed data register.

32. The method of example 27, further comprising: decoding a second instruction having fields for the first and the second packed data source operand, and a second packed data destination operand; and executing the decoded second instruction to: multiplex the data values from the plurality of packed data element positions in the first and second packed data source operands to the at least one multiplier circuit, the first and second packed data source operands including the plurality of pairs complex numbers, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand 33. The method of example 27, wherein the decoded instruction and the decoded second instruction are executed in a loop and the packed data destination operand and second packed data destination operand are different packed data registers.

34. A non-transitory machine-readable medium storing an instruction which when executed by a processor causes the processor to perform a method, the method comprising: decoding an instruction having fields for a first and a second packed data source operand, and a packed data destination operand, and executing the decoded instruction, by execution circuitry, to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

35. The non-transitory machine-readable medium of example 34, wherein the first source packed data operand is a packed data register and the second source packed data operand is a memory location.

36. The non-transitory machine-readable medium of example 34, wherein the first source packed data operand is a packed data register and the second source packed data operand is a packed data register.

37. The non-transitory machine-readable medium of example 34, wherein to calculate an imaginary part of a product of each pair of complex numbers the execution circuitry is further to: multiply a real part of each complex number of the first packed data source operand by an imaginary part of each corresponding complex number of the second packed data source operand to generate a first plurality of products; multiply an imaginary part of each complex number of the first packed data source operand by a real part of each complex number of the second packed data source operand to generate a second plurality of products; and add each of the second plurality of products to a corresponding product of the first plurality of products to generate the imaginary part of the product of each pair of complex numbers.

38. The non-transitory machine-readable medium of example 34, wherein the packed data destination operand is a packed data register and the first packed data element position is a lower 64 bits of the packed data register and the second packed data element position is an upper 64 bits of the packed data register.

39. The non-transitory machine-readable medium of example 34, wherein the method further comprises: decoding a second instruction having fields for the first and the second packed data source operand, and a second packed data destination operand; and executing the decoded second instruction to: multiplex the data values from the plurality of packed data element positions in the first and second packed data source operands to the at least one multiplier circuit, the first and second packed data source operands including the plurality of pairs complex numbers, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand.

40. The non-transitory machine-readable medium of example 34, wherein the decoded instruction and the decoded second instruction are executed in a loop and the packed data destination operand and second packed data destination operand are different packed data registers.

41. An apparatus comprising: a decoder to decode a first instruction having first fields for a first and a second packed data source operand, and a first packed data destination operand, and a second instruction having second fields for the first and the second packed data source operand, and a second packed data destination operand; execution circuitry to execute the decoded first instruction to: multiplex data values from a plurality of packed data element positions in the first and second packed data source operands to at least one multiplier circuit, the first and second packed data source operands including a plurality of pairs complex numbers, each pair of complex numbers including data values at shared packed data element positions in the first and second packed data source operands, calculate a real part of a product of each pair of complex numbers and output the real part of the product of each pair of complex numbers to an adder network, add the real part of the product of a first pair of complex numbers to the real part of the product of a second pair of complex numbers to calculate a first real result, and add the real part of the product of a third pair of complex numbers to the real part of the product of a fourth pair of complex numbers to calculate a second real result, and store the first real result to a first packed data element position in the destination operand and store the second real result to a second packed data element position in the destination operand; and the execution circuitry to execute the decoded second instruction to: multiplex the data values from the plurality of packed data element positions in the first and second packed data source operands to the at least one multiplier circuit, the first and second packed data source operands including the plurality of pairs complex numbers, calculate an imaginary part of a product of each pair of complex numbers and output the imaginary part of the product of each pair of complex numbers to the adder network, add the imaginary part of the product of a first pair of complex numbers to the imaginary part of the product of a second pair of complex numbers to calculate a first imaginary result, and add the imaginary part of the product of a third pair of complex numbers to the imaginary part of the product of a fourth pair of complex numbers to calculate a second imaginary result, and store the first imaginary result to the first packed data element position in the destination operand and store the second imaginary result to the second packed data element position in the destination operand.

42. The apparatus of example 41, wherein to calculate a real part of a product of each pair of complex numbers the execution circuitry is further to: multiply a real part of each complex number of the first packed data source operand by a real part of each corresponding complex number of the second packed data source operand to generate a first plurality of products; multiply an imaginary part of each complex number of the first packed data source operand by an imaginary part of each complex number of the second packed data source operand to generate a second plurality of products; and subtract each of the second plurality of products from a corresponding product of the first plurality of products to generate the real part of the product of each pair of complex numbers.

43. The apparatus of example 41, wherein to calculate an imaginary part of a product of each pair of complex numbers the execution circuitry is further to: multiply a real part of each complex number of the first packed data source operand by an imaginary part of each corresponding complex number of the second packed data source operand to generate a first plurality of products; multiply an imaginary part of each complex number of the first packed data source operand by a real part of each complex number of the second packed data source operand to generate a second plurality of products; and add each of the second plurality of products to a corresponding product of the first plurality of products to generate the imaginary part of the product of each pair of complex numbers.

44. The apparatus of example 41, wherein the first packed data destination operand is a packed data register and the first packed data element position is a lower 64 bits of the packed data register and the second packed data element position is an upper 64 bits of the packed data register.

45. The apparatus of example 41, wherein the decoded instruction and the decoded second instruction are executed in a loop and the first packed data destination operand and second packed data destination operand are different packed data registers.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 78 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

Figure 7B:
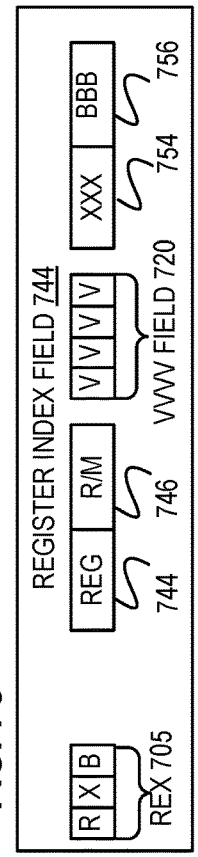
FIG. 7B is a block diagram illustrating the fields of the specific vector friendly instruction format that make up the full opcode field according to one embodiment of the invention.
Figure 7C:
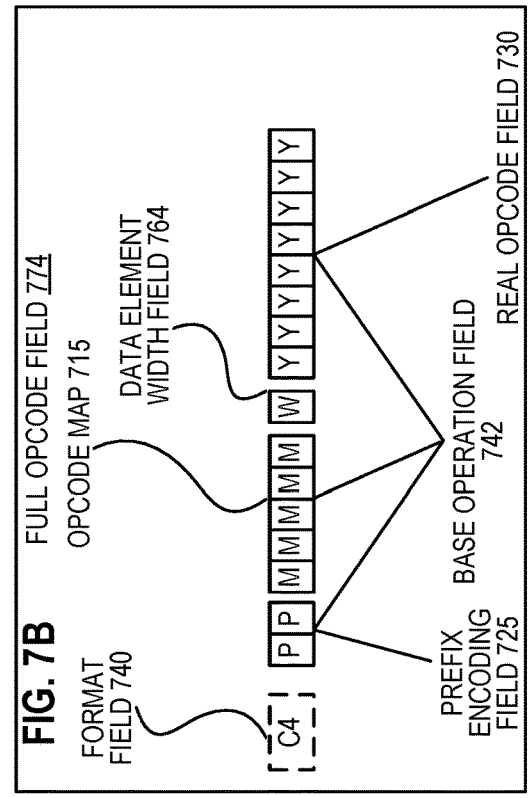
FIG. 7C is a block diagram illustrating the fields of the specific vector friendly instruction format that make up the register index field according to one embodiment of the invention.

Figure Q1 illustrates an exemplary AVX instruction format including a VEX prefix 702, real opcode field 730, Mod R/M byte 740, SIB byte 750, displacement field 762, and IMM8 772. FIG. 7B illustrates which fields from Figure Q1 make up a full opcode field 774 and a base operation field 741. FIG. 7C illustrates which fields from Figure Q1 make up a register index field 744.

VEX Prefix (Bytes 0-2) 702 is encoded in a three-byte form. The first byte is the Format Field 790 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 705 (VEX Byte 1, bits [7-5]) consists of a VEX.R bit field (VEX Byte 1, bit [7]–R), VEX.X bit field (VEX byte 1, bit [6]–X), and VEX.B bit field (VEX byte 1, bit[5]–B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 715 (VEX byte 1, bits [4:0]–mmmmm) includes content to encode an implied leading opcode byte. W Field 764 (VEX byte 2, bit [7]–W)-is represented by the notation VEX.W, and provides different functions depending on the instruction. The role of VEX.vvvv 720 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 768 Size field (VEX byte 2, bit [2]-L)=0, it indicates 78 bit vector; if VEX.L=1, it indicates 256 bit vector. Prefix encoding field 725 (VEX byte 2, bits [1:0]-pp) provides additional bits for the base operation field 741.

Real Opcode Field 730 (Byte 3) is also known as the opcode byte. Part of the opcode is specified in this field.

MOD R/M Field 740 (Byte 4) includes MOD field 742 (bits [7-6]), Reg field 744 (bits [5-3]), and R/M field 746 (bits [2-0]). The role of Reg field 744 may include the following: encoding either the destination register operand or a source register operand (the rrr of Rrrr), or be treated as an opcode extension and not used to encode any instruction operand. The role of R/M field 746 may include the following: encoding the instruction operand that references a memory address, or encoding either the destination register operand or a source register operand.

Scale, Index, Base (SIB)—The content of Scale field 750 (Byte 5) includes SS752 (bits [7-6]), which is used for memory address generation. The contents of SIB.xxx 754 (bits [5-3]) and SIB.bbb 756 (bits [2-0]) have been previously referred to with regard to the register indexes Xxxx and Bbbb.

The Displacement Field 762 and the immediate field (IMM8) 772 contain data.

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 11 zmm registers are overlaid on registers ymm0-15. The lower order 128 bits of the lower 11 zmm registers (the lower order 128 bits of the ymm registers) are overlaid on registers xmm0-15.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-order and Out-of-order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
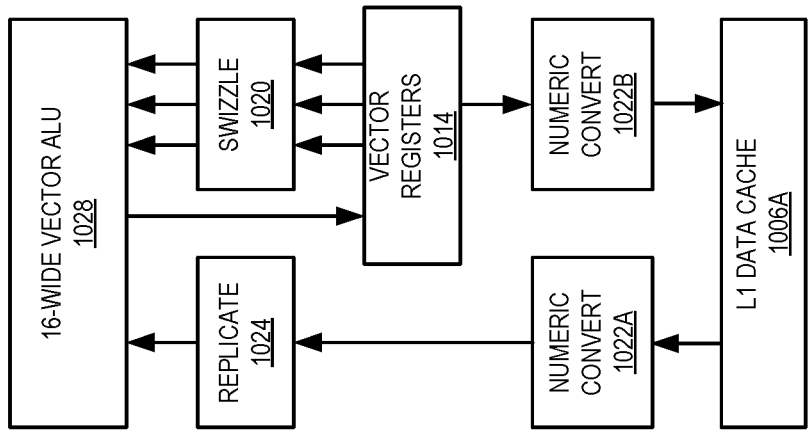
FIGS. 10A-B illustrate a block diagram of a more specific exemplary in-order core architecture, which core would be one of several logic blocks (including other cores of the same type and/or different types) in a chip.
Figure 10A:
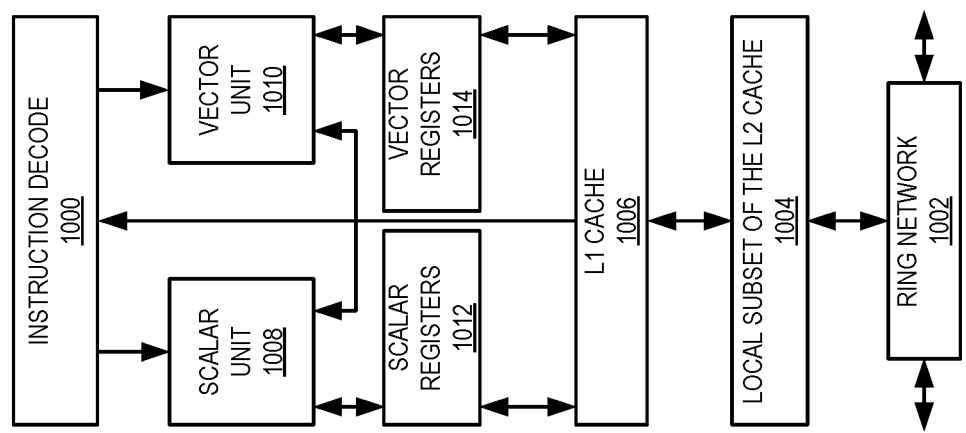

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 11-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
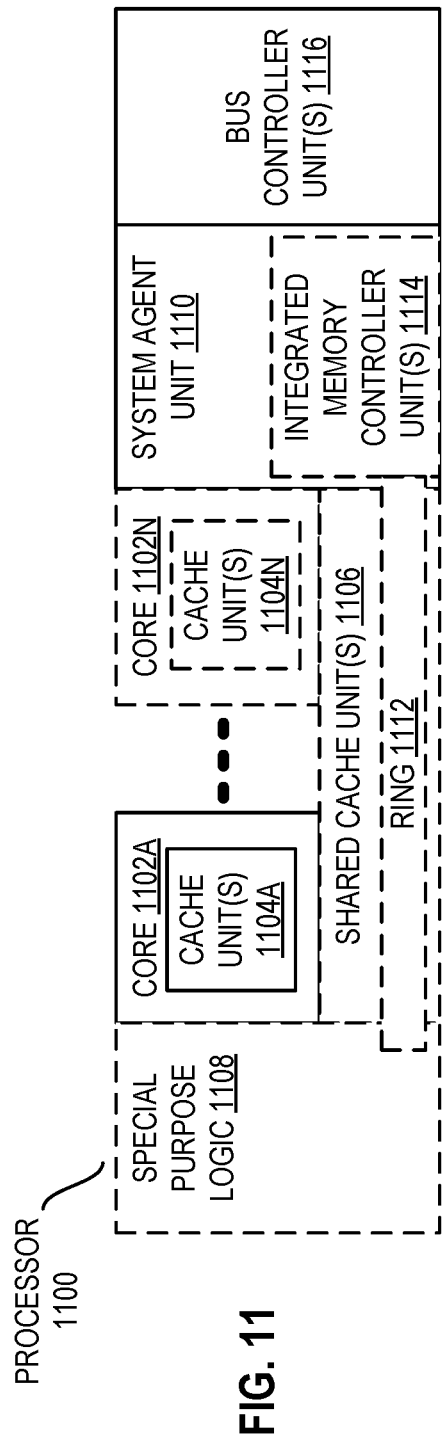
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores 1104A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
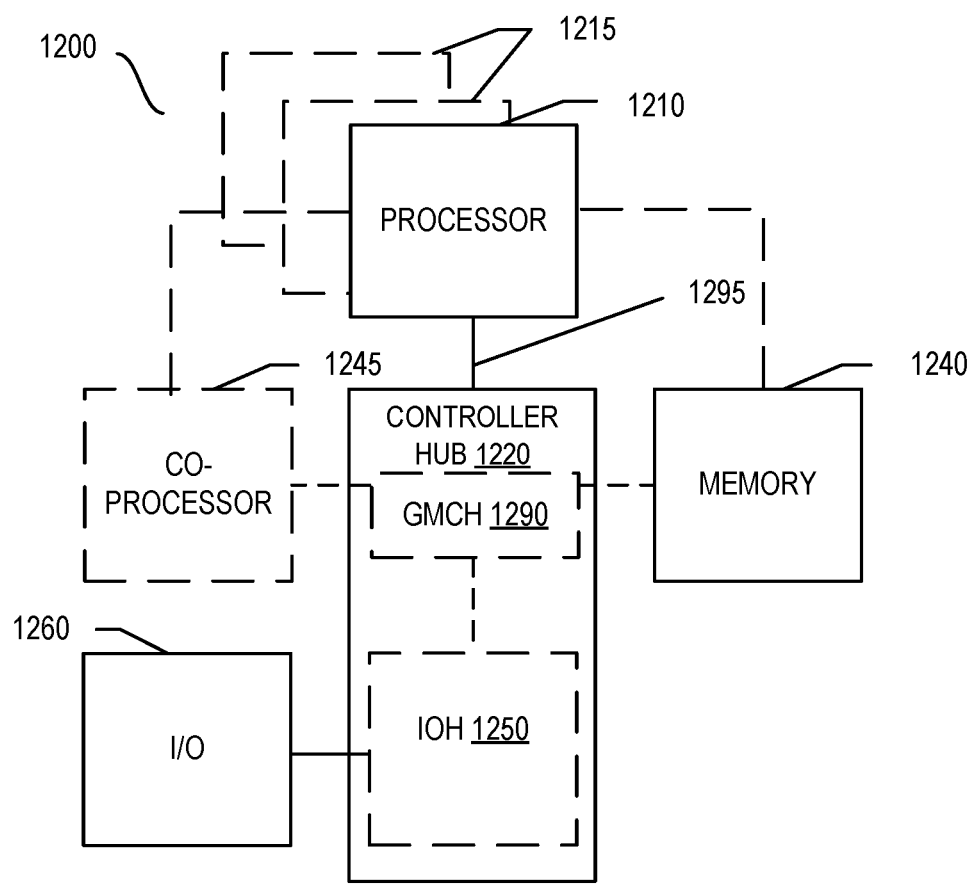
FIG. 12 shown a block diagram of a system in accordance with one embodiment of the present invention.

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 12155 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
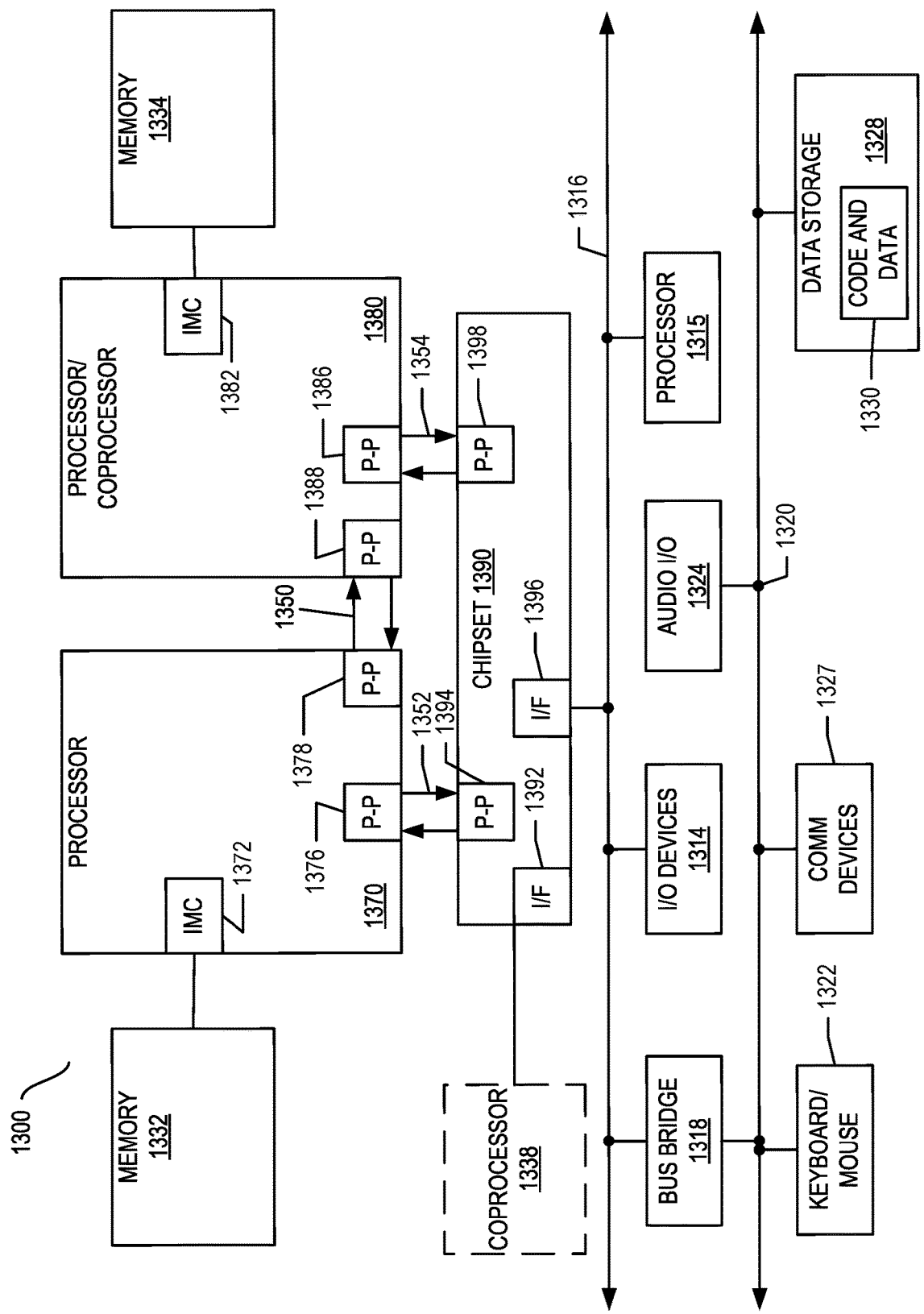
FIG. 13 is a block diagram of a first more specific exemplary system in accordance with an embodiment of the present invention.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1316. Note that other architectures are possible. For example, instead of the point-to-point architecture of FIG. 13, a system may implement a multi-drop bus or other such architecture.

Figure 14:
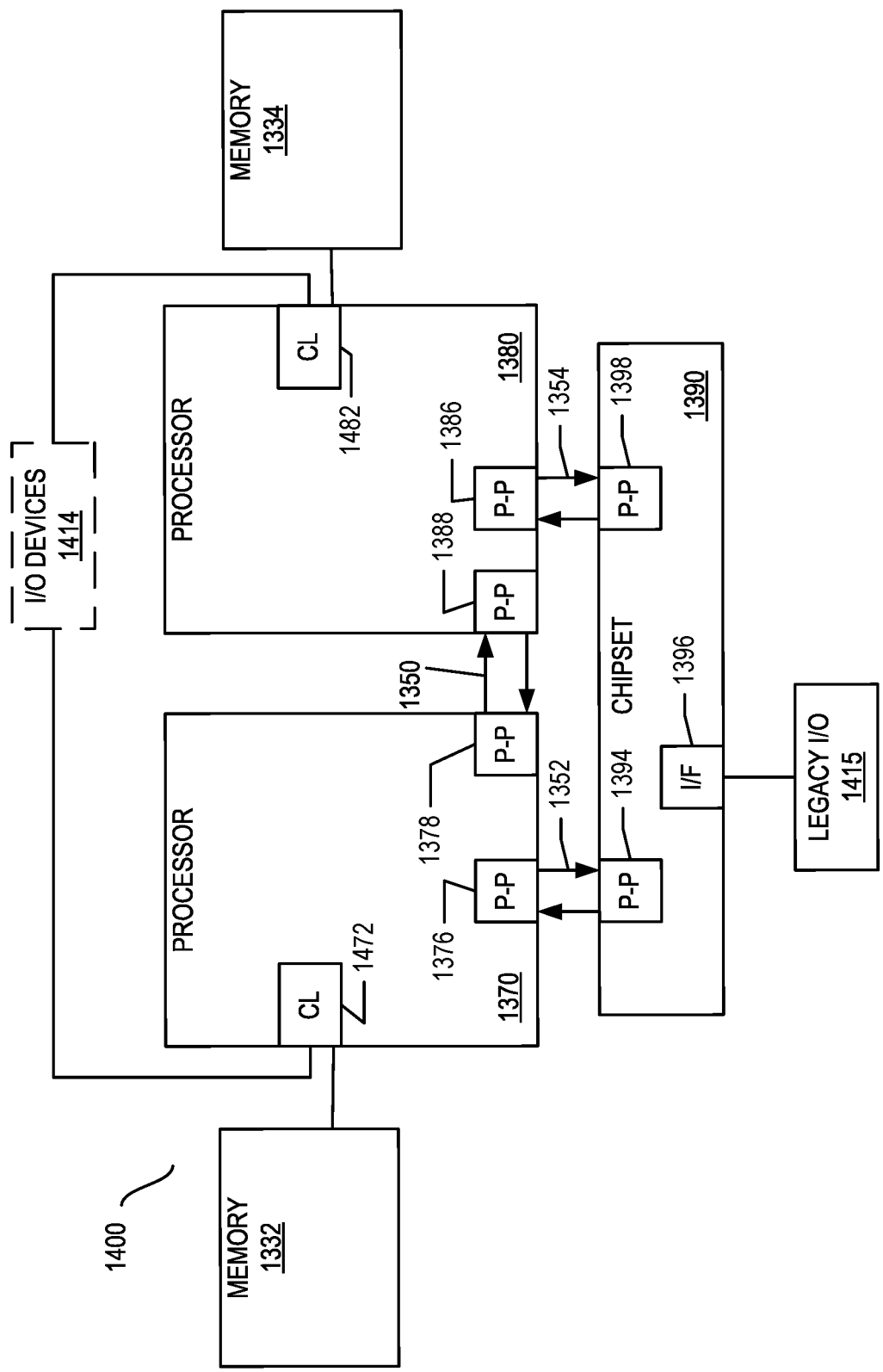
FIG. 14 is a block diagram of a second more specific exemplary system in accordance with an embodiment of the present invention.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
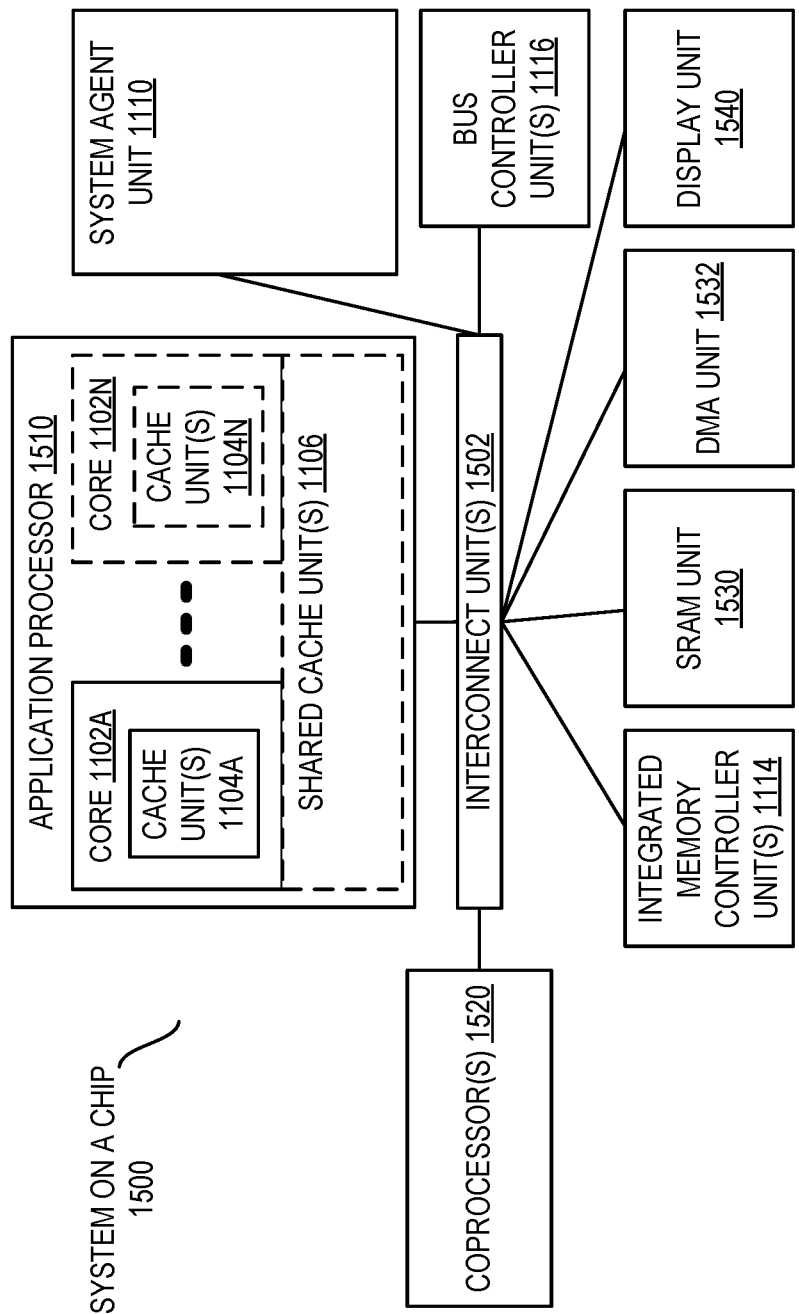
FIG. 15 is a block diagram of a SoC in accordance with an embodiment of the present invention.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 152A-N, cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
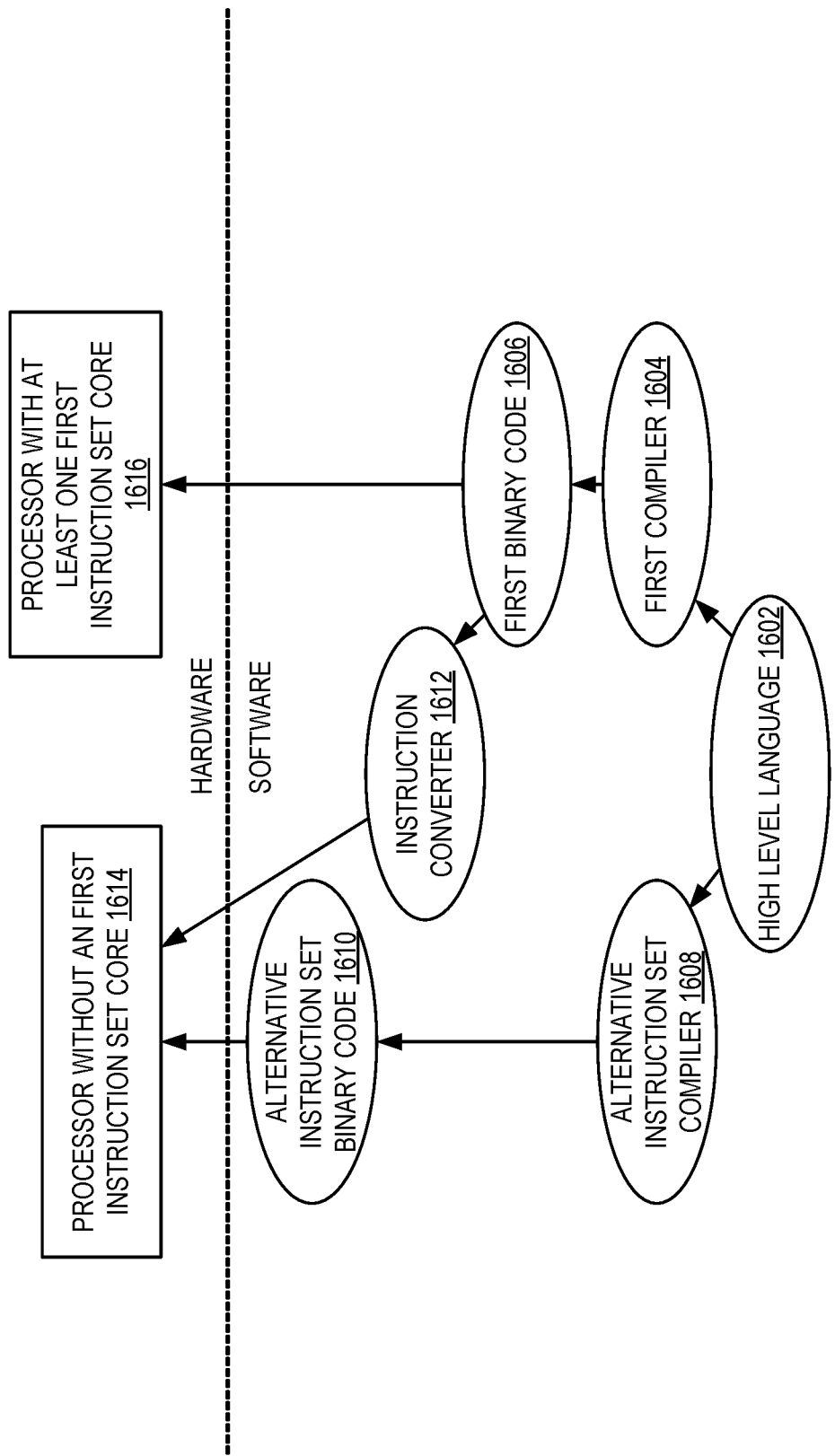
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an first compiler 1604 to generate a first binary code (e.g., x86) 1606 that may be natively executed by a processor with at least one first instruction set core 1616. In some embodiments, the processor with at least one first instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1604 represents a compiler that is operable to generate binary code of the first instruction set 1606 (e.g., object code) that can, with or without additional linkage processing, be executed on the processor with at least one first instruction set core 1616. Similarly, FIG. 16 shows the program in the high level language 1602 may be compiled using an alternative instruction set compiler 1608 to generate alternative instruction set binary code 1610 that may be natively executed by a processor without at least one first instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the first binary code 1606 into code that may be natively executed by the processor without an first instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have a first instruction set processor or core to execute the first binary code 1606.

What is claimed is:

1. An apparatus comprising:
   decoder circuitry configured to decode a single instruction having an opcode, a first field to represent a packed data destination operand, a second field to represent a first packed data source operand, and a third field to represent a second packed data source operand, the first and second packed data source operands including a plurality of pairs of complex numbers, each pair of complex numbers including data values at shared packed data element positions in the first and second packed data source operands; and
   execution circuitry coupled to the decoder circuitry, wherein in response to the decoded single instruction, the execution circuitry, according to the opcode of the single instruction, for each of the plurality of pairs of complex numbers is configured to:
      multiply a real part of a complex number of the first packed data source operand by a real part of a corresponding complex number of the second packed data source operand to generate a first product;
      multiply an imaginary part of the complex number of the first packed data source operand by an imaginary part of the corresponding complex number of the second packed data source operand to generate a second product;
      subtract the second product from the first product to generate a real part of a product of the pair of complex numbers; and
      store the real part of the product of the pair of complex numbers in at least one storage.

2. The apparatus of claim 1, wherein the execution circuitry is to saturate the real part of the product of each pair of complex numbers.

3. The apparatus of claim 1, wherein the instruction comprises a dual complex multiply instruction.

4. The apparatus of claim 1, wherein the execution circuitry, when a width of the packed first and second data source operands is 128 bits, is configured to perform 4 iterations of the real part multiply and the imaginary part multiply.

5. The apparatus of claim 1, wherein the execution circuitry is configured to multiply the real part of the complex number of the first packed data source operand comprising 16 bits by the real part of the corresponding complex number of the second packed data source operand comprising 16 bits.

6. A method comprising:
   decoding, in a decoder of a processor, a single instruction having an opcode, a first field to represent a packed data destination operand, a second field to represent a first packed data source operand, and a third field to represent a second packed data source operand, the first and second packed data source operands including a plurality of pairs of complex numbers, each pair of complex numbers including data values at shared packed data element positions in the first and second packed data source operands; and
   executing, in execution circuitry coupled to the decoder, according to the opcode of the single instruction to, for each of the plurality of pairs of complex numbers:
      multiply a real part of a complex number of the first packed data source operand by a real part of a corresponding complex number of the second packed data source operand to generate a first product;
      multiply an imaginary part of the complex number of the first packed data source operand by an imaginary part of the corresponding complex number of the second packed data source operand to generate a second product;
      subtract the second product from the first product to generate a real part of a product of the pair of complex numbers; and
      store the real part of the product of the pair of complex numbers in at least one storage.

7. The method of claim 6, wherein the executing further comprises saturating the real part of the product of each pair of complex numbers.

8. The method of claim 6, wherein decoding the single instruction comprises decoding a dual complex multiply instruction.

9. The method of claim 6, wherein, when a width of the packed first and second data source operands is 128 bits, the method comprises performing 4 iterations of the real part multiply and the imaginary part multiply.

10. The method of claim 6, further comprising multiplying the real part of the complex number of the first packed data source operand comprising 16 bits by the real part of the corresponding complex number of the second packed data source operand comprising 16 bits.

11. A non-transitory machine-readable medium comprising an instruction, which when executed by a processor, causes the processor to:
    decode, in a decoder of the processor, a single instruction having an opcode, a first field to represent a packed data destination operand, a second field to represent a first packed data source operand, and a third field to represent a second packed data source operand, the first and second packed data source operands including a plurality of pairs of complex numbers, each pair of complex numbers including data values at shared packed data element positions in the first and second packed data source operands; and
    execute, in execution circuitry coupled to the decoder, according to the opcode of the single instruction to, for each of the plurality of pairs of complex numbers:
        multiply a real part of a complex number of the first packed data source operand by a real part of a corresponding complex number of the second packed data source operand to generate a first product;
        multiply an imaginary part of the complex number of the first packed data source operand by an imaginary part of the corresponding complex number of the second packed data source operand to generate a second product;
        subtract the second product from the first product to generate a real part of a product of the pair of complex numbers; and
        store the real part of the product of the pair of complex numbers in at least one storage.

12. The non-transitory storage machine-readable medium of claim 11, wherein the single instruction, when executed by the processor, causes the processor to saturate the real part of the product of each pair of complex numbers.

13. The non-transitory storage machine-readable medium of claim 11, wherein the single instruction, when executed by the processor, causes the processor to decode the single instruction comprising a dual complex multiply instruction.

14. The non-transitory storage machine-readable medium of claim 11, wherein the single instruction, when executed by the processor, causes the processor to, when a width of the packed first and second data source operands is 128 bits, perform 4 iterations of the real part multiply and the imaginary part multiply.

15. The non-transitory storage machine-readable medium of claim 11, wherein the single instruction, when executed by the processor, causes the processor to multiply the real part of the complex number of the first packed data source operand comprising 16 bits by the real part of the corresponding complex number of the second packed data source operand comprising 16 bits.

* * * * *